Jan. 13, 1959 M. BERMAN ET AL 2,868,879

PLUG-IN PORTABLE TELEPHONE SYSTEM

Filed March 29, 1957 2 Sheets-Sheet 1

INVENTORS
Martin Berman
Lester C. Pine
BY L. S. Saulsbury
ATTORNEY

Jan. 13, 1959 M. BERMAN ET AL 2,868,879

PLUG-IN PORTABLE TELEPHONE SYSTEM

Filed March 29, 1957 2 Sheets-Sheet 2

INVENTORS
Martin Berman
Lester C. Pine

BY L. S. Saulsbury

ATTORNEY

United States Patent Office 2,868,879

Patented Jan. 13, 1959

2,868,879

PLUG-IN PORTABLE TELEPHONE SYSTEM

Martin Berman, Laurelton, and Lester C. Pine, Bellerose, N. Y.

Application March 29, 1957, Serial No. 649,412

4 Claims. (Cl. 179—1)

This invention relates to a plug-in portable telephone system.

It is the principal object of the present invention to provide a plug-in portable telephone system which can be readily installed in the field without need of any knowledge of telephone circuits and by merely the simple operation of joining plugs and sockets together.

It is another object of the invention to provide a plug-in portable telephone system in which the electrical source, the interexchange circuits, the connecting cables, and the telephone sets can all be packaged in a single cartage box for delivery to the field or place where the system is to be set up and there assembled by merely connecting the cables by their plugs with sockets on the box bearing wires from the battery and interexchange circuits and running the cables and the several telephones to remote locations and without further effort the system made ready for immediate use.

It is still another object of the invention to provide a plug-in portable telephone system wherein not only may the several telephones be connected by quick connect and disconnect cables with a central battery box but by as simple an operation as connecting or disconnecting any one of the telephones, a three-way plug and socket connector can be installed to provide an extension line for any one of the telephones of the system or by a connector joining cable to locate any one of the telephones at a more remote distance.

It is a further object of the invention to provide self-contained telephone sets for use in a portable telephone system which have a built-in selector knob that can be turned to select a telephone station to be called and a ringing push button which when pressed will ring the selected telephone station.

Further objects of the invention are to provide in a plug-in portable telephone system, having the above objects in mind, which is of simple construction, easy to assemble and wire, inexpensive to manufacture, compact, light in weight when assembled, has a minimum number of parts, effective and efficient in use.

Figures 1, 2, 3, 4, 5:
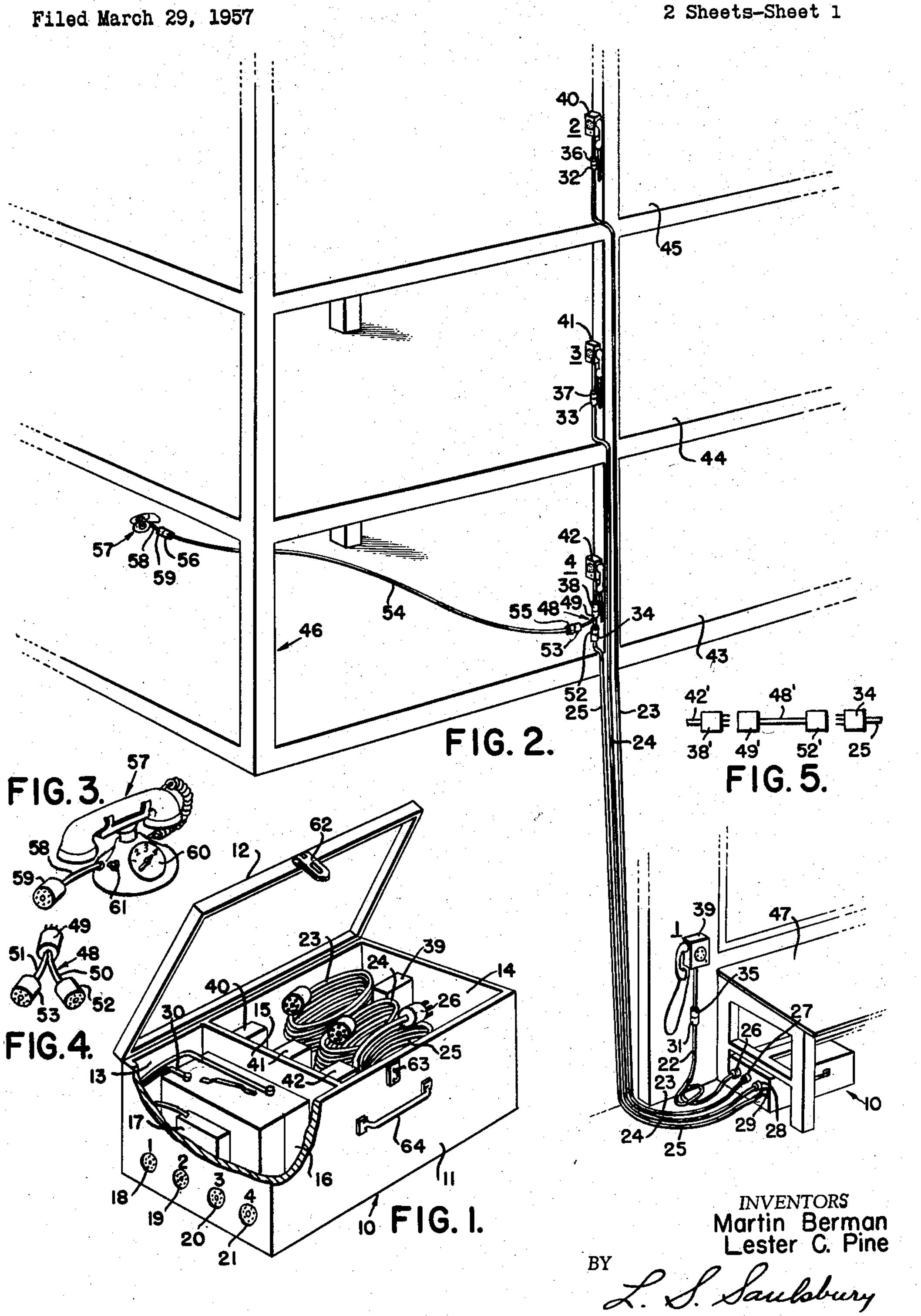
Figure 6:
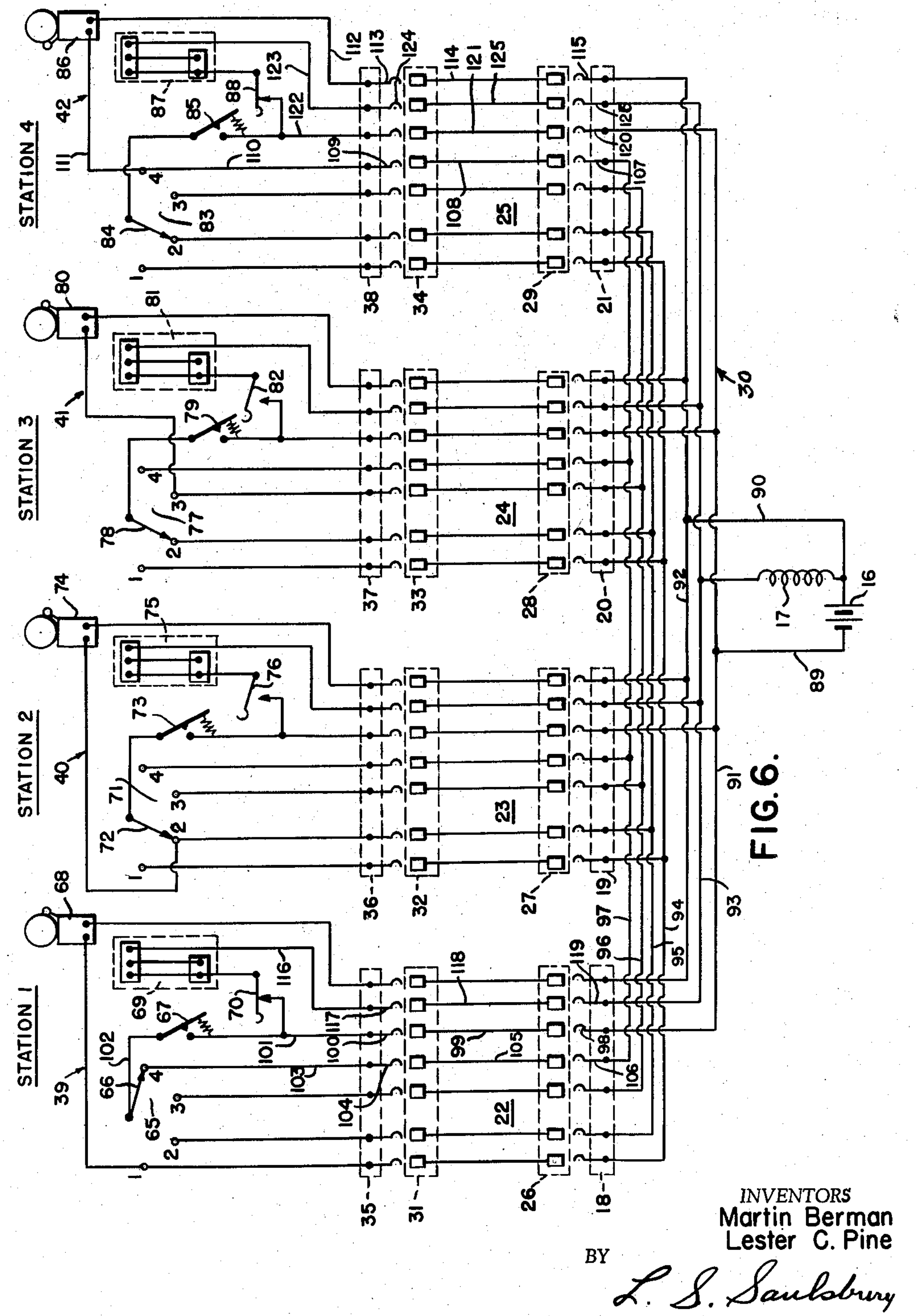

For a better understanding of the invention, reference may be had to the following detailed description taken in connection with the accompanying drawing, in which:

Figure 1 is a portable box containing a battery, an ignition coil, interexchange circuits and plug-in sockets, and which has storage space for the telephones and various cables to be used for connecting them to the box, Fig. 2 is a perspective view of the portable system fully installed in a building structure with all of the telephones connected to the box by the connecting cables and located respectively on the different floors of the building structure and with one extension telephone connected to one of the telephones, Fig. 3 is a perspective view of the extension telephone unit that is of the French phone type, Fig. 4 is a perspective view of the three-way extension plug and socket connector, Fig. 5 is a collective view of a cable coupler for joining two cables together, and Fig. 6 is a wiring diagram of the telephone system including the interexchange and battery circuits within the box and the individual telephone station circuits.

Referring now to the figures, 10 represents a cartage box having a compartmented bottom 11 and a hinge cover 12. The cartage box has two compartments 13 and 14 that are separated by a partition 15. In the compartment 13 is located a dry cell battery 16 supplying seven and one-half volts, an induction coil 17 and the interexchange wires. On the end of the box bottom 11 are four socket outlets 18, 19, 20 and 21 to which telephone cables 22, 23, 24 and 25 may be respectively connected by their respective plugs 26, 27, 28 and 29. The respective socket outlets are preferably identified by station members "1," "2," "3" and "4." Appropriate wiring 30 as shown in the wiring diagram in Fig. 6 makes up the interexchange circuits and is provided within the compartment 13 and connected between the battery, induction coil and sockets 18, 19, 20 and 21. This circuitry will hereinafter be described with reference to the wiring diagram in Fig. 6. The cables 22, 23, 24 and 25 may be of different length or may be say standard fifty and one hundred foot lengths and can be joined together by connectors as shown in Fig. 5. These cables respectively have plugs 31, 32, 33 and 34 on their opposite ends that are adapted to respectively engage with respective telephone sockets 35, 36, 37 and 38 of respective telephone station sets 39, 40, 41 and 42 located at respective stations "1," "2," "3" and "4," one station being located near the box 10 and the others on the respective floors 43, 44 and 45 of a building structure 46. The box 10 is of such size that it may be placed under a table or bench 47. The cables have plugs on each end thereof and these plugs are polarized with and fit any of the sockets of the box and telephone station sets.

If it is desired to place an extension on one of the telephone stations a three-way plug and socket connector 48 such as shown in Figs. 2 and 4 having a plug 49, two cables 50 and 51 respectively connected in parallel upon the plug 49 and respectively having plug sockets 52 and 53. The connector 48 can be inserted so that its plug 49 enters the socket 38 in the telephone set 42 at station "4." The socket 52 is connected with the plug 34 of the cable 25 and to socket 53 of the connector 48 there is connected an extension cable 54 by its plug 55 and which has on its other end a plug 56 to which an extension telephone 57 is connected. All of the cables including the extension cable have a plug on each end. The extension telephone 57 is of the French type as best shown in Fig. 3. It has a short cable 58 and a socket 59 adapted to receive the cable plug 56. It will be understood that the other stations "1," "2" and "3" may similarly have an extension connected to them in a similar manner. The telephone 57 has a selector switch 60 and a press button ringer 61 to ring the bell at selected station. Preferably all the cables come in fifty and one hundred foot lengths. The cable can be connected together to obtain a greater length by using a short coupler 48' having sockets 49' and 52' adapted to be connected between cable 25 by its plug 34' and a cable 42' by its plug 38', Fig. 5, while the wall-type telephone has been used for the main telephones, it will be understood that French type telephones may be used throughout the system.

It will be understood that the cables, the telephones and the extension line connectors can all be stored in the compartment 14 of the box 10 and the entire system transported as a unit. The box 10 can be locked by a hinge clasp 62 extended over an eye 63 on the bottom 11 and with a padlock extended through the eye. A handle 64 is provided on the box bottom 11 for carrying the box.

Each of the wall telephone sets 39, 40, 41 and 42 has a station selector switch, a hand set, a bell, a press button for ringing the bell of another station, and a hook switch. The telephone set 39 at station "1" has a station selector switch 65 having a selector arm 66, a press button bell ringer switch 67, a bell 68, a hand set 69, and a hook switch 70, Fig. 6. The telephone set 40 at station "2" has a selector switch 71 having a selector arm 72, a press button bell ringer switch 73, a bell 74, a hand set 75, and a hook switch 76. The telephone set 41 at station "3" has a selector switch 77 having a selector arm 78, a press button bell ringer switch 79, a bell 80, a hand set 81, and a hook switch 82. The telephone set 42 at station "4" has a selector switch 83 having a selector arm 84, a press button bell ringer switch 85, a bell 86, a hand set 87, and a hook switch 88.

Within the box positive and negative wires 89 and 90 respectively lead from battery 16 to common bus wires 91 and 92. The induction coil 17 is connected to the negative side of the battery from wire 90 and to a common bus wire 93. These common bus wires 91, 92 and 93 are respectively connected by branch wires to the respective box sockets 18, 19, 20 and 21. The remaining four terminals of the respective box sockets are similarly respectively joined to one another by common wires 94, 95, 96 and 97. All of these common wires are fully provided within the box to provide the interexchange 30.

It will thus be seen that the battery induction coil and the interexchange wiring 30 are fully within the box and that the cables are merely needed to be joined to the sockets for the connection of the telephones to the box, thereby making for a prewired telephone exchange.

If the party station "1" is to call station "4" the selector arm 66 is turned to contact "4" as shown and the press button 67 is depressed to ring bell 86 at station "4." The circuit can be traced from the battery 16 through wire 89, wire 91, terminal 98 of socket 18, wire 99 in cable 22, terminal 100 of socket 35 of telephone 39, wire 101, press button switch 67, wire 102, selector arm 66, contact "4" of selector switch 65, wire 103, terminal 104 of socket 35 of telephone 39, wire 105 of cable 22. terminal 106 of box socket 18, wire 97, within the box, terminal 107 of socket 21, wire 108 of cable 25, terminal 109 of socket 38, wires 110 and 111, bell 86 of station "4," wire 112, terminal 113 of socket 38 for telephone set 42 of wire 114 of cable 25, terminal 115 of box socket 21, wires 92 and 90 within the box to the negative side of the battery 16. As the press button 67 is depressed at station "1" the bell 86 at station "4" is thus rung. A similar circuit can be followed for ringing stations "2" and "3" from station "1" and the other stations can be similarly connected with any selected station to ring the bell at that station.

With the bell having been rung and the person at station "4" having lifted the hand set 87 from the hook switch 88 will be closed and the station prepared for talking. The talking circuits all extend to the wires 91 and 93 that connect them with the battery 16 and induction coil 17. The talking circuit for station "1" can be traced as follows: Beginning with the battery 16 current passes through wires 89 and 91, terminal 98 of box socket 18, wire 99 in cable 22, terminal 100 of socket 35, wire 101, hook switch 70, hand set 69, wire 116, terminal 117 of telephone socket 35, wire 118 of cable 22, terminal 119 of box socket 18, wire 93, induction coil 17 and to negative side of battery 16. The station "4" is connected to the interexchange circuit 30 by terminal 120 of socket 21, cable wire 121, wire 122, hook switch 88, hand set 87, wire 123, terminal 124, wire 125, terminal 126 of box socket 21, wire 93, induction coil 17 and the negative side of battery 16. Similar connections can be made with the other stations through other wires of the cables. Only the circuits between stations "1" and "4" have been traced but similar circuits can be traced for any two of the other stations. If desired, all of the stations can be permitted to be used at the same time so four parties can be on the line at once.

It will now be apparent that a simple plug-in portable telephone system has been provided which can be wired for set up by a layman by simply plugging cable wires into the box sockets and telephone sockets. An electrician is not needed for this wiring.

It shall be further apparent that all of the parts of this system can be readily stored within and be transported by the box. Such a box can be delivered on the job where construction may be going on and set up by the ordinary workmen on the job. The cables of the telephone are plugged into the box and run therefrom to the stations and into the telephones. All circuits pass through the box and the selection of the stations and the bell of the selected station rung from the one station.

While various changes may be made in the detailed construction, it shall be understood that such changes shall be within the spirit and scope of the present invention as defined by the appended claims.

What is claimed is:

1. A portable telephone system as a unit adapted to be connected and disconnected into a telephone line comprising a central box having therein a battery source, an induction coil in the box, a plurality of multi-wire cables with quick connecting members in the box as interexchange bell ringing and talking circuits including the battery source with the induction coil and the connecting members, a plurality of sockets mounted in a wall of the box, the set of multi-wire cables having terminal cooperating connecting members on the respective ends thereof and adapted to fit the respective sockets, and telephone sets in the box and having connecting members engageable with the connecting members on the opposite ends of the cables, each of said telephone sets having a bell with a selector switch and a push button switch for ringing a bell at the selected station together with a hand set and a switch adapted to be operated by the hand set, whereby the telephone system may be completely assembled by making quick connections, the entire system being adapted to be housed in the box for portable purposes.

2. A portable telephone system as defined in claim 1, and said multi-wire quick connect members on the box and on the telephone being in the form of plug receiving sockets and the connecting members on the opposite ends of the cables being both in the form of pronged plugs.

3. A portable telephone system as defined in claim 1, and an extension line adaptor for the provision of an extension cable placed between the quick connecting members of the cable with either the box quick-connecting member or with the telephone quick-connect member, said extension connecting member comprising two short cables respectively having a quick-connect member thereon and a third quick-connect member joining together in parallel relationship the wires of the two cables, and an extension line cable of the same quick-connect member arrangement as the main telephone cables secured to the free socket of the extension line connector and an extension telephone having a selector switch, a bell ringer, a hand set, a bell, hand set switch and a quick-connect member, the latter of which being connected to the cooperating quick-connect member of the opposite end of the cable.

4. A portable telephone system as defined in claim 1, and a cable line adaptor comprising a short length of cable having similar quick connect members on the opposite ends thereof and adapted to receive the respective quick-connect members of the cable that are being joined.

References Cited in the file of this patent

UNITED STATES PATENTS

| | | |
|---|---|---|
| 1,127,005 | Howk | Feb. 2, 1915 |
| 1,251,536 | Kechler | Jan. 1, 1918 |
| 2,547,855 | Campbell | Apr. 3, 1951 |
| 2,764,637 | Adler | Sept. 25, 1956 |